No. 885,157. PATENTED APR. 21, 1908.
A. HOVLAND.
CENTRAL DELIVERY REAPER.
APPLICATION FILED FEB. 25, 1907.
4 SHEETS—SHEET 1.
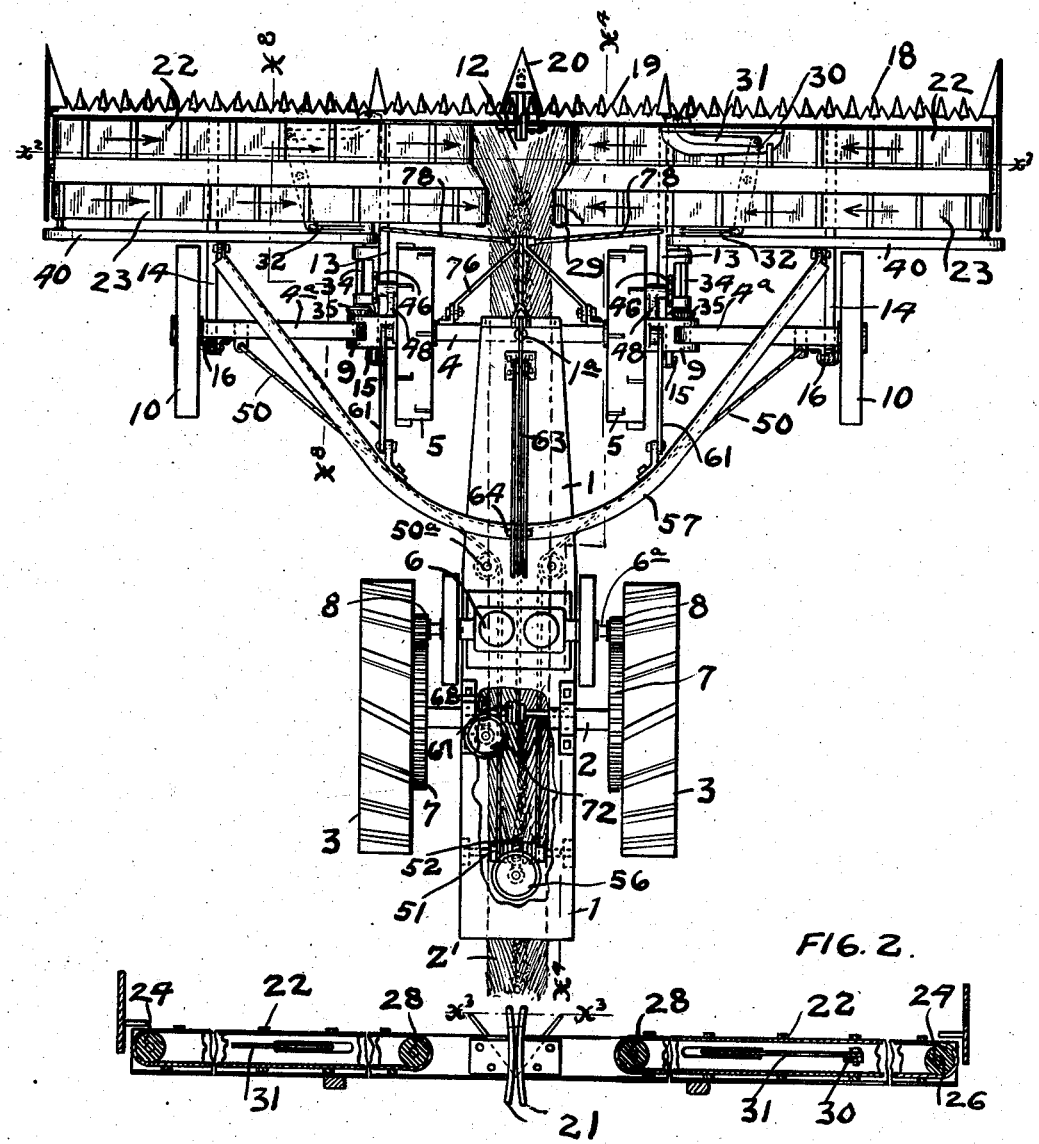
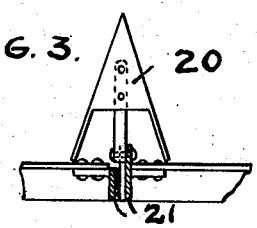
WITNESSES
J. Jessen
A. H. Opsahl.
INVENTOR
AUGUST HOVLAND
BY 
ATTORNEYS

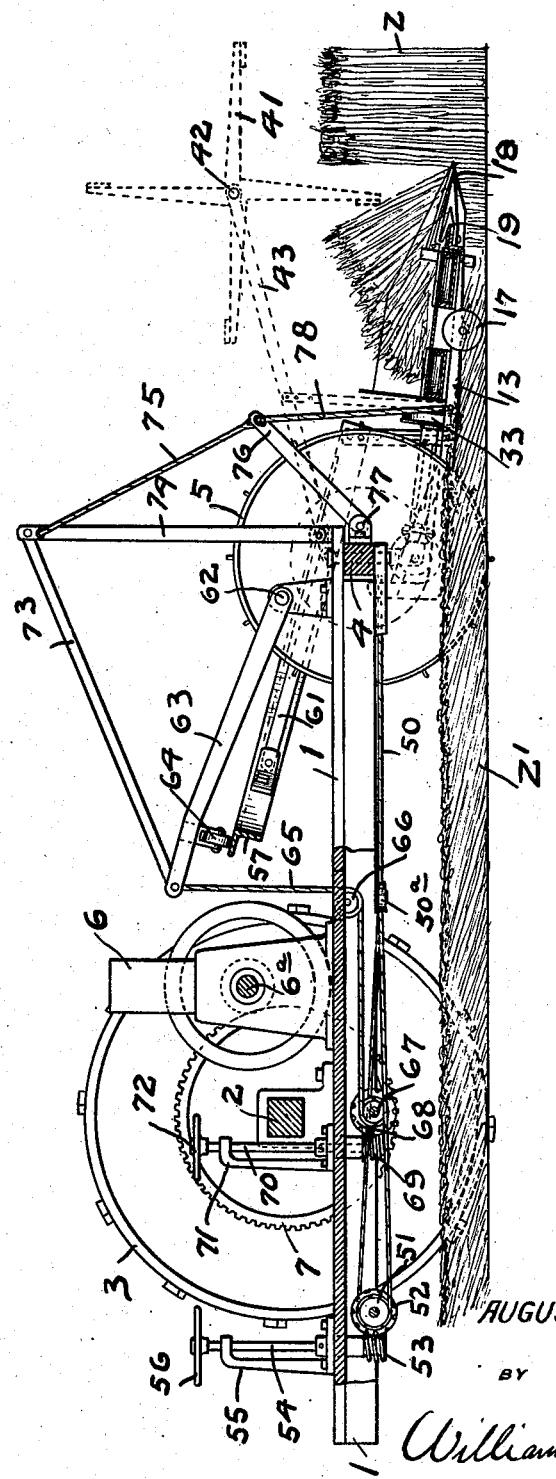

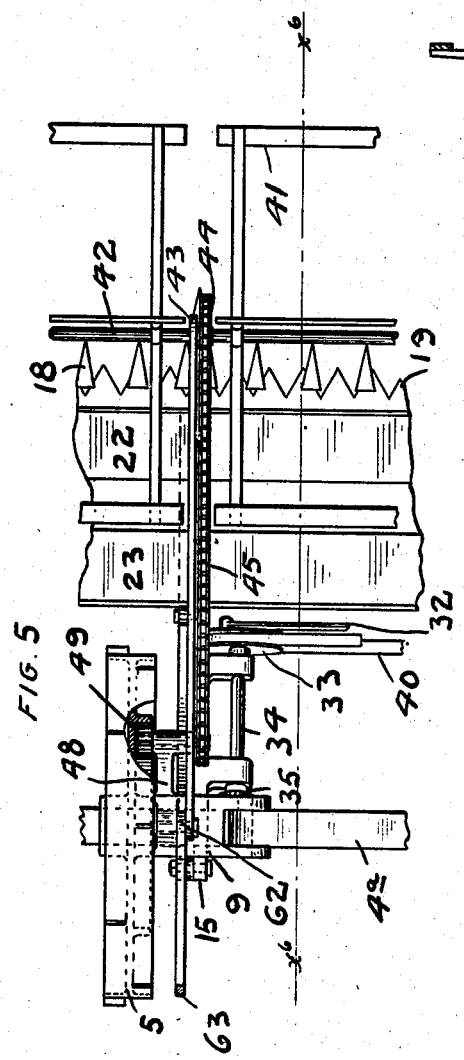

No. 885,157. PATENTED APR. 21, 1908.
A. HOVLAND.
CENTRAL DELIVERY REAPER.
APPLICATION FILED FEB. 25, 1907.

4 SHEETS—SHEET 4.

WITNESSES
J. Jessen
A. H. Opsahl.

INVENTOR
AUGUST HOVLAND
BY
Williamson & Merchant
ATTORNEYS

UNITED STATES PATENT OFFICE.

AUGUST HOVLAND, OF WAUBAY, SOUTH DAKOTA.

CENTRAL-DELIVERY REAPER.

No. 885,157.  Specification of Letters Patent.  Patented April 21, 1908.

Application filed February 25, 1907. Serial No. 359,095.

*To all whom it may concern:*

Be it known that I, AUGUST HOVLAND, a citizen of the United States, residing at Waubay, in the county of Day and State of South Dakota, have invented certain new and useful Improvements in Central-Delivery Reapers; and I do hereby declare the following to be a full, clear, and exact description of the invention, such as will enable others skilled in the art to which it appertains to make and use the same.

My invention relates to the harvesting of grain, and has for its immediate object the provision of an improved reaper.

Ever since the date of the invention of the twine binder, it has been the universal custom to bind into bundles all grain, such as wheat, oats, flax and other grains that are to be threshed. For a much longer period of time, reapers and mowers have been in use for cutting grain. In the cutting of the grain by these reapers or mowers, the cut grain would fall in spread out sheets and with the heads of the grain upon or close to the ground, so that it would not properly cure if left in the position into which it would fall when cut. Hence, it was necessary to bind and shock the cut grain in some manner to prepare it for curing.

My invention provides what may be termed a duplex or central delivery reaper, and which is adapted to cut grain on both sides of the point of delivery of the machine, and to deposit the cut grain in the form of a windrow in which the heads of the grain are arranged at the top of the row, so that they will properly cure in the position in which they are left by the reaper. By this operation, binding or stacking of the cut grain as a step preparatory to threshing is made unnecessary.

In a companion application filed by me of even date herewith, entitled "Traveling thresher", I have provided a machine especially adapted to pick up and thresh the grain left in windrows by my improved reaper, herein disclosed and claimed.

The improved reaper is illustrated in the accompanying drawings, wherein like characters indicate like parts throughout the several views.

Figure 8:
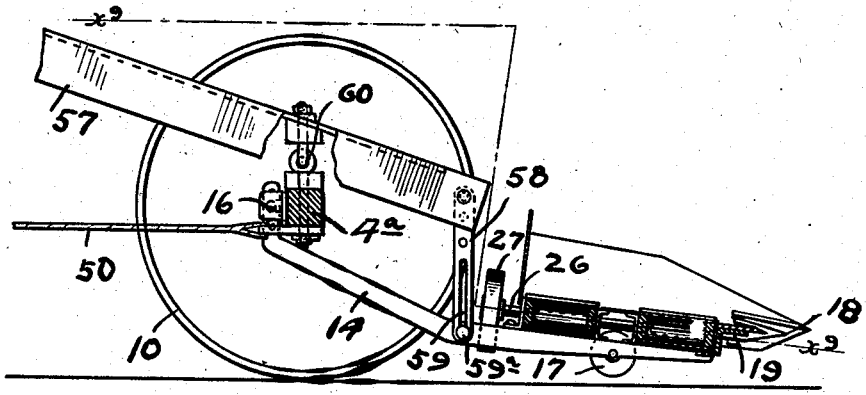
Figure 9:
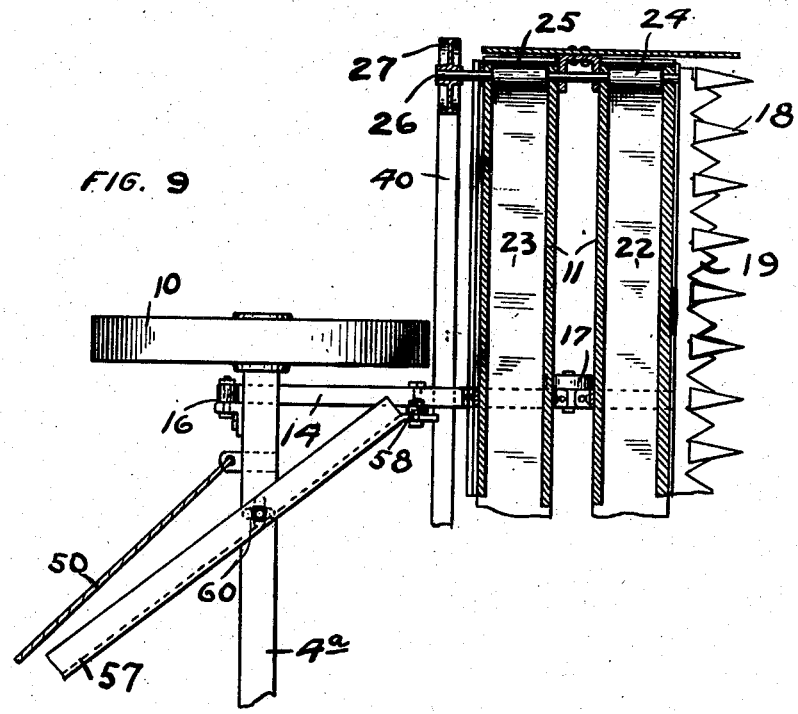

Referring to the drawings, Figure 1 is a plan view of the improved reaper, some parts being broken away. Fig. 2 is a transverse vertical section, taken on the line $x^2$ $x^2$ of Fig. 1. Fig. 3 is a detail in horizontal section, taken on the line $x^3$ $x^3$ of Fig. 2. Fig. 4 is a longitudinal section taken through the machine approximately on the irregular line $x^4$ $x^4$ of Fig. 1. Fig. 5 is a plan view, showing the intermediate forward portion of the machine, some parts being broken away. Fig. 6 is a section taken on the line $x^6$ $x^6$ of Fig. 5. Fig. 7 is a vertical section taken on the line $x^7$ $x^7$ of Fig. 6. Fig. 8 is a vertical section taken on the irregular line $x^8$ $x^8$ of Fig. 1; and Fig. 9 is a horizontal section taken on the irregular line $x^9$ $x^9$ of Fig. 8.

So far as the broad idea of this invention is concerned, the improved reaper may be propelled forward, either by an engine carried thereby, or by horses hitched thereto, but preferably, and as illustrated in the drawings, it is in the nature of a traction rig and is provided with an explosive engine, by means of which it is driven.

The traction engine proper is made up, as shown, of a heavy platform frame 1, rear axle 2, rear traction wheels 3, front axle 4, front traction wheels 5, and an explosive engine 6 mounted on said platform 1. The traction wheels 3 are loosely mounted on the axle 2 and are provided with large gears 7 that mesh with pinions 8 carried by the engine crank shaft $6^a$. The rear axle 2 is rigidly secured to the platform 1, while the front axle 4 is pivoted thereto for its steering movements, and the front wheels 5 are loosely journaled thereon.

The front axle 4, outward of the wheel 5, is provided with rigidly secured bearing heads 9 to which axle extensions $4^a$ are pivotally connected with freedom for vertical movements only with respect to the said axle or intermediate axle section 4. On the outer ends of the extension axles $4^a$, supporting wheels 10 are loosely journaled.

Extending transversely of the machine, in front of the wheels 5 and 10, are two independently supported but transversely alined grain receiving platforms 11, the inner ends of which are spaced apart to afford a grain delivery passage or opening 12. To the bottom of each platform 11 is rigidly secured a pair of strong rearwardly projecting arms 13 and 14. The arms 13, at their upturned rear ends, are pivotally connected at 15 to lugs of the corresponding axle heads 9, and said arms 14, in a similar manner, are pivotally attached at 16 to ears on the free ends of the vertically movable axle extensions 4ª. Small wheels 17 are applied to the forward portion of the arms 13 and 14. A finger-equipped sickle supporting bar 18 is rigidly secured to the front edge of each platform 11, and working in each toothed bar 18 is a sickle bar 19. Secured to one of the bars 18 and spanning the gap between the inner ends of the two sickles 19, (see Figs. 1 and 3) is a spreader 20. The abutting ends of the toothed bars 18 are provided with frictionally engaging segmental chafing plates 21 (see Fig. 2). Working longitudinally of each platform 11 are two endless conveyer belts 22—23. The outer portions of the belts 22—23 run over rollers 24—25, the common shaft 26 of which is suitably journaled in said platform and is provided at its projecting rear end with a pulley 27. The inner portions of the two forward belts 22 run over idle guide rollers 28, suitably journaled in the platforms 11, and likewise the inner portion of the two rear conveyer belts 23 run over similar guide rollers 29, also journaled in said platforms. The guide rollers 28 are located farther apart than the guide rollers 29 and, hence, of course, it follows that the rear conveyer belts 23 project inward beyond the inner portions of the forward belts 22. This arrangement, as will hereinafter more clearly appear, causes the belts to deliver the cut grain in a windrow with the heads of the grain assembled together in a sort of a ridge at the top of the windrow.

A lever 30 is intermediately pivoted to the bottom of each platform 11, and the forward end thereof is connected by a pitman 31 to the intermediate portion of the corresponding sickle 19. The rear ends of the levers 30 are connected by crank rods 32 to the crank pin of a crank disk, which latter, as shown, is in the form of a grooved pulley 33. Each pulley 33 is carried by a short shaft 34 which is journaled in an extended arm 9ª of the cooperating head 9, which, as previously noted, is rigidly secured to the adjacent outer end of the axle 4. At its rear end, each shaft 34 is provided with a bevel pinion 35 that meshes with a bevel gear 36 carried by a short shaft 37 journaled in the adjacent head 9 and provided at its other end with a spur pinion 38 that meshes with an internal gear 39 of the corresponding front traction wheel 5. The connections just described, as is obvious, will vibrate the sickle bars 19 under forward movement of the machine. The conveyer belts 22 and 23 are driven in the directions of the arrows marked thereon in Fig. 1, through the connections described and through driving belts 40 that run over the respective pulleys 33 and 27.

The reels used in connection with the cutting mechanism of the reaper may be of any suitable form, but as shown said reels 41 are provided with shafts 42 journaled in the forward ends of suitably braced supporting arms 43, which arms, in turn, as shown, are supported from the heads 9 and platforms 11. On each reel shaft 42 is a sprocket 44. A sprocket chain 45 runs over each sprocket 44 and over a sprocket 46 carried by a short shaft 47 journaled in an arm 48 of the adjacent head 9, and provided at its other end with a spur gear 49 that meshes with the internal gear 39 of the adjacent wheel 5.

As a simple and efficient means for steering the machine, I preferably employ a pair of cables 50 which at their forward ends are attached one to the outer end of each axle extension 4ª. These cables are extended rearwardly under the platform 1 and are attached at their rear ends to the opposite ends of a windlass drum 51 upon which they are reversely wound (see Figs. 1 and 4). The shaft of this windlass drum is mounted in suitable bearings on the rear lower portion of the platform 1, and at its central portion is provided with a worm gear 52 that meshes with a worm 53 on the lower end of an upright shaft 54. The shaft 54 is mounted in a suitable pedestal 55 on the rear portion of the platform 1, and at its upper end is provided with a hand wheel 56 by means of which it may be rotated in either direction to steer the machine. The intermediate portions of the cables 50 run against sheaves 50ª on the under portion of the platform 1.

As a simple and efficient means for raising and lowering the two platforms 11 simultaneously, I provide mechanism which, as shown, comprises the following parts: The numeral 57 indicates a heavy metallic lifting yoke, the intermediate portion of which is segmental and follows the arc of a circle struck from the axis of the pivotal connection 1ª between the platform 1 and the front axle 4. The ends of this yoke 57 are pivotally connected to the upper ends of lifting links 58, the lower ends of which are connected to the intermediate portions of the outer platform supporting arms 14, by means of slots 59 and studs 59ª (see particularly Fig. 8). The legs of the yoke 57 are connected to the axle extensions 4ª by hinge joints 60 (see Figs. 8 and 9) and inward of said hinges, said yoke is connected to the fixed axle heads 9 by links 61. The pivotal connections between said links 61 and heads 9 are transversely in line with the hinges 60, so that the yoke 57, while free for vertical oscillatory movements on the hinges 60 as fulcrums, are caused to act as braces to prevent the free ends of the axle extensions 4ª from being forced rearward. The hinges 60 also permit the axle extensions 4ª to independently raise and lower.

Pivoted to a bearing 62 on the forward portion of the platform 1 is a so-called "presser arm" 63, which, near its rearwardly projecting free end, carries a wheel 64 that presses directly against the upper face of the segmental intermediate portion of the lifting yoke 57. A cable 65 attached to the free end of the presser arm 63 runs under an idle guide sheave 66 on the platform 1 and is wound upon a small windlass drum 67, the shaft of which is journaled in suitable bearings on the platform 1, and is provided with a worm gear 68. The worm gear 68 meshes with a worm 69 carried by the lower end of an upright shaft 70 mounted in a bearing pedestal 71 on the platform 1, and provided with a hand wheel 72 at its upper end, by means of which it may be turned.

The free end of the presser arm 63 is connected by a link 73 to the upper end of a bracket or mast 74, the lower end of which is pivoted to a bearing on the forward end of the platform 1. The upper end of the mast 74 is connected by a cable 75 to the outer end of a V-shaped bracket 76 which is pivotally connected to bearings 77 on the axle 4. The free end of said bracket 76 is connected by a pair of cables 78 to the intermediate portions of the two inner platform supporting arms 13. The character $z$ indicates standing grain, and the character $z^1$ the cut grain which has been deposited in a windrow.

As is evident, the altitude or distance from the ground at which the sickle 19 would be held depends on the position of the so-called presser arm 63, and it is evident that with the said arm 63, in a certain set position, the machine may be steered, that is, the platforms 11 and parts carried thereby may be oscillated in a horizontal plane without raising or lowering of the sickle or platforms. Normally, the platform will be so held that the wheels 17 on the platform supporting arms 13 and 14 will be out of contact with the ground. The wheels 17, however, are adapted to be brought into contact with elevated portions of the ground or knolls, and when thus engaged with the ground will raise the platforms and prevent the fingers of the bar 18 from being thrown into the ground. As is evident, the flexible connections 75—78 and slotted links 58 permit the platform to raise as just stated when the wheels 17 are engaged with the ground.

It is, of course, evident that under the forward movement of the machine the grain which is cut will, by the reels 41, be thrown onto the inwardly moving conveyer belts 22—23, and by said belts will be carried to the central discharge opening 12 where the two reversely and inwardly moving streams of grain will be deposited in the windrow on a longitudinal line between the traction wheels of the machine. It is also evident that the shorter belts 22 will drop the butt ends of the grain before the head ends of the grain are dropped by the longer rear belts 23. This has the effect of causing the heads of the grain to be carried to the central upper portion of the windrow, or, in other words, farther inward and above the butt ends of the grain, thus depositing the grain in such manner that the heads of the grain will be out of contact with the ground and exposed to the sun and air, where the grain will properly cure or complete its ripening action, required for threshing. Preferably, the driving rollers 25 are slightly larger in diameter than the rollers 24, so that the rear belts 23 will move slightly faster than the belts 22. Also, the said conveyer belts are preferably provided with slats to increase their carrying efficiency. Between the belts 22 and 23, the platforms 11 are shown as provided with smooth deck sections $11^a$ which prevent catching of the grain on the platform.

What I claim is:

1. In a central delivery reaper, the combination with cutting mechanism, of means for conveying the cut grain to the central portion of the machine, the said conveying means being spaced apart to afford a discharge passage through which the grain may be delivered in a windrow upon the ground.

2. In a central delivery reaper, the combination with cutting mechanism, of reversely and inwardly driven conveyers located back of said cutting mechanism spaced apart at their inner delivery ends to afford a discharge passage, and arranged to deliver the cut grain through said discharge passage in a windrow upon the ground, substantially as described.

3. In a machine of the kind described, the combination with a truck, of transversely spaced platforms carried at the front portion of said truck, cutting mechanism applied to the forward portions of said platforms, and reversely and inwardly driven conveyers mounted on said platforms and arranged to deliver the cut grain in a windrow upon the ground, through passages left between the inner ends of said platforms, substantially as described.

4. In a machine of the kind described, the combination with a truck, of a pair of transversely spaced platforms adjustably supported by and in front of said truck, cutting mechanism applied to the front portions of said platforms, and reversely and inwardly driven endless conveyers on said platforms, arranged to deliver the cut grain through the discharge passage formed between the inner ends of said platforms, whereby said grain is deposited in a windrow upon the ground, substantially as described.

5. In a machine of the kind described, the combination with a truck having a pivoted front axle, of a pair of transversely spaced platforms carried by the front portion of said truck and connected to said pivoted front axle for horizontal oscillatory movements therewith, cutting mechanism on the front portion of said platforms, and reversely and inwardly driven conveyers on said platforms arranged to deliver the cut grain upon the ground between the inner ends of said platforms, substantially as described.

6. In a machine of the kind described, the combination with a truck having a pivoted wheel-equipped front axle, and which front axle is provided with wheel-equipped axle extensions connected for vertical pivotal movements with respect thereto but held for horizontal pivotal movements therewith, of a pair of transversely spaced platforms, each having a pair of supporting arms pivotally connected one to said pivoted front axle, and the other to one of the axle extensions thereof, platform raising and lowering devices having their base of reaction on said front axle, cutting mechanism on the front portions of said platforms, and reversely and inwardly driven endless conveyers on said platforms, arranged to deliver cut grain between the inner ends of said platforms and in a windrow upon the ground, substantially as described.

7. In a machine of the kind described, the combination with a truck having a pivoted front axle and traction wheels journaled thereon, of a pair of platforms spaced apart at their inner ends and supported in front of said traction wheels and front axle, but connected for horizontal oscillatory movements therewith, sickles mounted on the front portions of said platforms, endless conveyer belts mounted on said platforms, and sickle and conveyer driving mechanism driven from the traction wheels on the said pivoted axle, substantially as described.

8. In a machine of the kind described, the combination with a truck having a pivoted front axle and traction wheels mounted thereon, of wheel-equipped axle extensions connected to said pivoted axle for independent vertical movements, platforms supported at the front of the machine and connected to said pivoted front axle and the axle extensions thereof, sickles on the front portions of said platforms, reversely and inwardly driven conveyer belts mounted on said platforms, and sickle and conveyer belt driving mechanisms driven from the traction wheels on said pivoted front axle, substantially as described.

9. In a machine of the kind described, the combination with a truck, of a pair of transversely spaced platforms, sickles mounted on the front portions of said platforms, and front and rear conveyer belts mounted on each platform, the rear conveyer belts being extended at their delivery portions closer together than the delivery portion of the forward conveyer belt, substantially as described.

10. In a machine of the kind described, the combination with a truck having a wheel equipped front axle pivotally connected for steering movements, of a platform connected to said front axle for horizontal pivotal movements therewith, but for vertical adjustments in respect thereto, cutting and conveying mechanism on said platform, and a platform raising and lowering device arranged to hold said platform in different vertical adjustments, but permitting free horizontal oscillatory movements thereof, substantially as described.

11. In a machine of the kind described, the combination with a truck having a wheel equipped pivoted front axle, of a platform connected to said front axle for horizontal oscillatory movements therewith but with freedom for vertical pivotal movements, of two operating devices on said truck, the one having connections for oscillating said front axle to thereby steer the machine, and the other having connections for raising and lowering said platform, and cutting mechanism and conveying mechanism on said platform, substantially as described.

In testimony whereof I affix my signature in presence of two witnesses.

AUGUST HOVLAND.

Witnesses:
  MALIE HOEL,
  F. D. MERCHANT.